United States Patent Office 2,908,649
Patented Oct. 13, 1959

2,908,649
ANTI-RUST EMULSION RESISTANT MINERAL OIL COMPOSITION

Elijah P. Cunningham, Kirkwood, and David W. Dinsmore, Affton, Mo., assignors to Monsanto Chemical Company, St. Louis, Mo., a corporation of Delaware No Drawing. Application October 1, 1956
Serial No. 612,972

9 Claims. (Cl. 252—49.9)

This invention relates to anti-rust mineral oil compositions containing a dimeric acid as an emulsion depressant.

Mineral oils, particularly those of lubricating viscosity, have a tendency to emulsify when agitated in the presence of water and such tendency has been found to be particularly enhanced when they are compounded with the rust inhibiting reaction product obtained by reacting monocarboxylic acids, polyalkylenepolyamines having one more nitrogen atom per molecule than alkylene groups in the molecule, and alkenyl succinic acid anhydrides. This invention provides a means of overcoming the problem and is particularly applicable to solvent refined mineral steam turbine oils compounded with said rust inhibitor which in service are more or less contaminated with water and therefore must resist emulsification as well as rusting.

Copending application Serial No. 447,406, filed August 2, 1954, discloses that dimeric acids are effective for suppressing the emulsification of mineral oil compositions, particularly those of lubricating viscosity, containing dissolved therein the reaction product obtained by reacting a monocarboxylic acid, a polyalkylenepolyamine having one more nitrogen atom per molecule than there are alkylene groups in the molecule, and an alkylene succinic acid anhydride. Said co-pending application discloses that very small amounts of dimeric acid based on the total composition are sufficient for emulsion suppression in most cases. In general the useful range of dimeric acid is from 0.001% to 0.1% based on the total composition and usually amounts within the range of 0.0025% to 0.05% are preferred.

When two like or unlike molecules of a polyethenoid monocarboxylic fatty acid condense to form a dicarboxylic acid, the product by definition is a dimer, or the carboxylic acid is said to be dimerized. In general, the dimeric acids of this invention are produced by the condensation of two like or unlike unsaturated aliphatic monocarboxylic acids having between about 16 and about 18 carbon atoms per molecule. Examples of such comprise Δ8,12-octadecadienoic acid
Δ9,11-octadecadienoic acid
Δ9,12-octadecadienoic acid (linoleic acid)
Δ9,13-octadecadienoic acid
Δ9,11,13-octadecatrienoic acid
Δ9,12,15-octadecatrienoic acid The dimeric acids can be characterized as being dicarboxylic acids having either one substituted six-membered hydroaromatic ring or having two fused six-membered hydroaromatic rings, the one of which does not carry the two carboxylic acid groups being disubstituted. The dimeric acids are further characterized by having the two carboxylic acid groups attached to a single six-membered hydroaromatic ring through a plurality of ($CH_2$)-groups, the number of such groups being dependent upon the number of such groups between the carbon atom of the carboxylic acid group and the nearer carbon of the nearest double bond of the monocarboxylic acid. The substituents are alkyl or alkenyl groups depending upon the degree of unsaturation of the monocarboxylic acid from which the dimeric acid is derived. Thus, the dimeric acids derived from a diethenoid fatty acid, or a dienoic acid have a single six-membered hydroaromatic ring substituted in two immediately adjacent positions by two alkyl groups and in two other immediately adjacent positions by carboxylic acid groups separated from the hydroaromatic ring in one substituent by a straight chain unsaturated aliphatic group in the other by a straight chain saturated aliphatic group. Consequently, the dimeric acids of the rust inhibiting material when prepared from the individual monocarboxylic acid are represented by two formulae

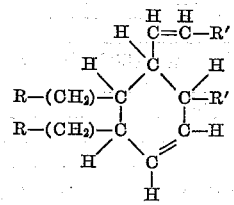

where R is $CH_3(CH_2)_n-$, and R' is $-(CH_2)_mCOOH$ and $n$ is a small number one more than the number of $CH_2=$ groups between the terminal $CH_3-$ group and the nearer carbon of the nearer double bond of the diethenoid monocarboxylic acid from which the dimeric acid is derived and $m$ is a small number representing the number of $CH_2=$ groups between the carbon of the carboxylic group and the nearer carbon of the nearer double bond of the diethenoid monocarboxylic acid from which the dimeric acid is derived, and

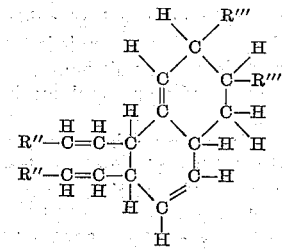

where R″ is $CH_3(CH_2)_n$ and R‴ is $-(CH_2)_mCOOH$ and $n$ and $m$ have the same significance as before. The dimeric acids are dicarboxylic acids derived from two molecules of polyethenoid fatty acids of drying and semi-drying oils and from fatty acids such as ricinoleic acid which upon dehydration become polyethenoid fatty acids. Therefore, in general, dimeric acids are dicarboxylic acids derived by the condensation of two molecules of one or more polyethenoid aliphatic monocarboxylic acids.

While the dimeric acids can be used in pure form, for practical reasons impure forms are used. That is to say, the dimeric acids are not presently available at commercially attractive costs in pure form. The purest form examined contained about 85% dimeric acids—the impurest sample examined contained about 45% dimeric acids. The preferred dimeric acid of this invention is that obtained by polymerizing linoleic acid. Linoleic acid may be polymerized by heating at a temperature of 330–360° C. in the presence of a small amount of water or in an atmosphere of steam for a period of 3 to 8 hours at pressures varying between 85 and 400 lbs. per. sq. in. The resulting product consists essentially of the dimer, but minor proportions of the trimer are also formed. Methods for carrying out this procedure in detail may be found in the article by Charles G. Goebel, Journal of the American Oil Chemists Society, vol. 24, pp. 65–8 (1947). This dimer is believed to have the formula

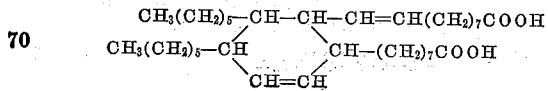

A well known source of this dimeric acid is the product sold by Emery Industries, Inc., and said to be dilinoleic acid. In the literature published by the Emery Industries, Inc., the properties of this product are given as follows:

| | |
|---|---|
| Neutral equivalent | 290–310. |
| Iodine value | 80–95. |
| Color | Gardner 12 (max.). |
| Dimer content | Approx. 85%. |
| Trimer and higher | Approx. 12%. |
| Monomer | Approx. 3%. |

Tests of several batches of material supplied by this producer indicate that the properties of this product are within the limits set forth hereinafter:

| | |
|---|---|
| Specific gravity, ° A.P.I. | 15–15.1 |
| Specific gravity, D60/60 | 0.9665 |
| Color, Lovibond | 35 |
| Kinematic viscosity at 100° F., centistokes | 2462–2666 |
| A.S.T.M. bromine No. | 39.3 |
| Neutrality No. | 186.8–190.4 |
| Iodine value | 67–86 |

It will be noted that the dimeric acids available from the Emery Industries, Inc., contain approximately 85% dimeric acids and about 12% trimeric and higher polymeric acids.

Another source of dimeric acids is the still residue of the dry distillation of castor oil in the presence of sodium hydroxide. This distillation yields approximately two equal fractions, the distillate and a second still residue, which residue contains about 45–50% of the dimeric acids and about 50% of the trimeric and higher polymeric acids. Since neither of these industrially available products is 100% dimeric acids it is manifest that materials containing more highly polymerized acids than the dimeric acids can be used. However, it is to be noted that these materials contain only small amounts, say less than 10% of the monocarboxylic or unpolymerized fatty acids and saturated acids.

Accordingly, preferred materials are those containing not more than about 15% of unpolymerized unsaturated fatty acids and saturated fatty acids. In general, the content of dimeric acids and trimeric and higher acids should be of the order of at least about 85% with the dimeric acids representing at least about 50% of the dimeric and higher polymeric acids. The Emery Industries' dimeric acids contain about 85% dimeric acids while the second still residue of the dry distillation of castor oil in the presence of sodium hydroxide contains about 46.8% dimeric acids.

The corrosion inhibitor referred to hereinbefore is obtained by reacting a monocarboxylic acid with a polyalkylenepolyamine having one more nitrogen atom per molecule than there are alkylene groups in the molecule, in a molar proportion varying between about one and about $(x-1)$ to one, respectively, wherein $x$ represents the number of nitrogen atoms in the polyalkylenepolyamine molecule, to produce an intermediate product, and reacting an alkenyl succinic acid anhydride with the intermediate product, in a molar proportion varying between about $(x-1)$ to one, respectively; the sum of the number of moles of the monocarboxylic acid and of the alkenyl succinic acid anhydride reacted with each mole of said polyalkylenepolyamine being no greater than $x$.

In general, the polyalkylenepolyamine reactants utilizable herein are those compounds having the structural formula, $H_2N(RNH)_zH$, wherein R is an alkylene radical, or a hydrocarbon radical-substituted alkylene radical, and $z$ is an integer greater than one, there being no upper limit to the number of alkylene groups in the molecule. It is preferred, however, to use the polyethylenepolyamines, because of their greater commercial availability. These compounds have the formula:

$$H_2N(C_2H_4NH)_zH$$

wherein $z$ is an integer varying between about two and about six. In naming the polyalkylenepolyamine reactants, the nitrogen atoms are considered to be attached to the terminal carbon atoms of the main carbon atom chain indicated in each compound name. For example, di-(1-methylamylene)triamine has the structural formula:

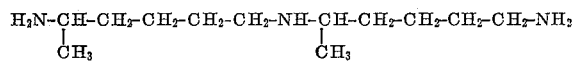

In numbering the main carbon atom chain, the carbon atom attached to the terminal —NH$_2$ radical is designated as the carbon atom in the 1-position. Similar alkylene groups recur throughout the molecule. Non-limiting examples of the polyalkylenepolyamine reactants are diethylenetriamine; triethylenetetramine; tetraethylenepentamine; di-(methylethylene)triamine; hexapropyleneheptamine; tri-(ethylethylene)tetramine; penta-(1-methylpropylene)-hexamine; tetrabutylenepentamine; hexa-(1,1-dimethylethylene)-heptamine; di-(1-methylbutylene)triamine; pentaamylenehexamine; tri-(1,2,2-trimethylethylene)tetramine; di-(1-methylamylene)triamine; tetra-(1,3-dimethylpropylene)pentamine; penta - (1,5 - dimethylamylene)hexamine; di-(1-methyl - 4 - ethylbutylene) - triamine; penta - (1,2 - dimethyl - 1-isopropylethylene)hexamine; tetraoctylenepentamine; tri-(1,4-diethylbutylene)-tetramine; tridecylenetetramine; tetra-(1,4-dipropylbutylene)pentamine; didodecylenetriamine; tetratetradecylenepentamine; penta - (1 - methyl - 4-nonylbutylene)hexamine; tri-(1,15-dimethylpentadecylene)tetramine; trioctadecylenetetraamine; dieicosylenetriamine; di-(1,2-dimethyl-14-nonyltetradecylene)triamine; di-(1,18-dioctyloctadecylene)triamine; penta-(1-methyl - 2 - benzylethylene)hexamine; tetra - (1 - methyl-3-benzylpropylene)pentamine; tri - (1-methyl-1-phenyl-3-propylpropylene)tetramine; and tetra-(1-ethyl-2-benzylethylene)pentamine.

The polyalkylenepolyamines can be prepared by several methods well known to the art. One well accepted method comprises reacting ammonia with an alkyl, or substituted alkyl, dihalide. For example, tetraethylenepentamine has been prepared by reacting ammonia with ethylene bromide.

Any monocarboxylic acid, or its acid anhydride or acid halide, can be reacted with the polyalkylenepolyamine reactant to produce the intermediate products used in preparing the corrosion inhibitor reaction products of the present invention. The aromatic and the heterocyclic monocarboxylic acids, as well as the aliphatic monocarboxylic acids are utilizable. Monocarboxylic acids containing substituent groups, such as halogen atoms, are also applicable herein. However, the preferred monocarboxylic acid reactants are the aliphatic monocarboxylic acids, i.e., the saturated or unsaturated, branched-chain or straight-chain, monocarboxylic acids, and the acid halides and acid anhydrides thereof. Particularly preferred are the aliphatic monocarboxylic acid reactants having a relatively long carbon chain length, such as a carbon chain length of between about 10 carbon atoms and about 30 carbon atoms. Non-limiting examples of the monocarboxylic acid reactant are formic acid; acetic acid; fluoroacetic acid; acetic anhydride; acetyl fluoride; acetyl chloride; propionic acid; propiolic acid; propionic acid anhydride; β-chloropropionic acid; propionyl bromide; bromoacetic acid; butyric acid anhydride; isobutyric acid; α-bromobutyric acid; crotonic acid chloride; crotonic acid anhydride; isocrotonic acid; β-ethylacrylic acid; valeric acid; acrylic acid anhydride; α-bromoisovaleric acid; allylacetic acid; hexanoic acid; hexanoyl chloride; caproic acid anhydride; sorbic acid; β-chloroacrylic acid; nitrosobutyric acid; aminovaleric acid; aminohexanoic acid; heptanoic acid; heptanoic acid anhydride; 2-ethylhexanoic acid; α-bromooctanoic acid; decanoic acid; dodecanoic acid; undecylenic acid; tetradecanoic acid; myristoyl bromide; hexadecanoic acid; palmitic acid; oleic acid; heptadecanoic acid; stearic acid; linoleic acid; linolenic acid; phenylstearic acid; xylylstearic acid; α-dodecyltetradecanoic acid; arachidic acid; behenic acid; behenolic acid; erucic acid; erucic acid anhydride; cerotic acid; selacholic acid; heptacosanoic acid anhydride; montanic acid; melissic acid; ketotriacontanoic acid; hexahydrobenzoic acid; hexahydrobenzoyl bromide; furoic acid; chlorofuroic acid; thiophene carboxylic acid; picolinic acid; nicotinic acid; benzoic acid; benzoic acid anhydride; benzoyl iodide; benzoyl chloride; toluic acid; xylic acid; chloroanthranilic acid; toluic acid anhydride; chlorodinitrobenzoic acid; cinnamic acid; cinnamic acid anhydride; aminocinnamic acid; salicylic acid; hydroxytoluic acid; iodosalicylic acid; naphthoyl chloride; and naphthoic acid.

Test data tend to establish that the first molecule of the monocarboxylic acid reactant which reacts with the polyethylenepolyamine reactant condenses with both a terminal nitrogen atom and the nitrogen atom adjacent thereto, with the formation of two molecules of water, to form an imidazoline ring. The other molecules of the monocarboxylic acid reactant probably react with the remaining nitrogen atoms to form acylated derivatives. No evidence has been found for the presence of more than one imidazoline ring per molecule of intermediate.

In order to produce an intermediate product which has at least one nitrogen atom free to react chemically with the alkenyl succinic acid anhydride reactant to produce mixtures of reaction products representing the complete chemical interaction of the reactants, rather than physical mixtures of alkenyl succinic acid anhydride with intermediate products and/or the reaction product representing the complete chemical interaction of the reactants, it is essential that no more than $(x-2)$ moles of monocarboxylic acid reactant be reacted with each mole of polyalkylenepolyamine reactant, $x$ representing the number of nitrogen atoms in the polyalkylenepolyamine molecule. Thus, the proportion of monocarboxylic acid reactant to polyalkylenepolyamine reactant will vary between about 1:1, respectively, and about $(x-2):1$, respectively, when the corrosion inhibiting reaction products representing the complete chemical interaction of the reactants are desired. It is especially preferred to produce intermediate products having two unreacted nitrogen atoms. To produce such intermediate products, the maximum proportion of monocarboxylic acid reactant to polyalkylenepolyamine will be $(x-3):1$, respectively.

When the number of moles of monocarboxylic acid reactant is only one less than the number of nitrogen atoms in the polyalkylenepolyamine reactant, i.e. $(x-1)$ moles, the intermediate product apparently will not have any nitrogen atoms free for further reaction with the alkenyl succinic acid anhydride reactant. It has been discovered, however, that such intermediate products can be combined with the alkenyl succinic acid anhydride reactant to produce products, probably physical mixtures, which are nevertheless utilizable as corrosion inhibitors. Therefore, the proportion of monocarboxylic acid reactant to polyalkylenepolyamine reactant varies broadly between about 1:1, respectively, and about $(x-1):1$, respectively. For example, when tetraethylenepentamine is utilized as the polyalkylenepolyamine reactant, one, two, three, or even four moles of a monocarboxylic acid reactant can be reacted with each mole thereof, to produce intermediate products suitable for the purposes contemplated herein. If five moles of monocarboxylic acid reactant are used, there may be an unreacted mole of monocarboxylic acid reactant, and such an intermediate product is not contemplated to be within the scope of corrosion inhibitors contemplated by the present invention. It must be strictly understood, therefore, that the intermediate products employed as corrosion inhibitors in this invention are not pure, definite chemical compounds. The available facts indicate that the reaction involved is much more complex. Evidence has been found for the formation of the imidazoline ring or the $\Delta^2$-tetrahydropyrimidine ring. However, the precise manner of reaction of the other moles of the monocarboxylic acid reactant is purely conjectural. This is substantiated by the fact that some residual acidity is always present in the intermediate product. In view of the foregoing, it will be understood that any designation assigned to these products, other than a definition comprising a recitation of the process of producing them, is not accurately descriptive of them.

The temperature at which the reaction between the monocarboxylic acid reactant and the polyalkylenepolyamine reactant is effected is not too critical. It is usually preferred to operate at temperatures varying between about 130° C. and about 160° C. It is to be understood, however, that the reaction between the monocarboxylic acid reactant and the polyalkylenepolyamine reactant can be effected at temperatures substantially lower than 130° C. and substantially higher than 160° C., and that the preparation of such is not to be limited to the preferred temperature range.

Water is formed as a by-product of the reaction between the monocarboxylic acid reactant and the polyalkylenepolyamine reactant. In order to facilitate the removal of this water a hydrocarbon solvent which forms an azeotropic mixture with water can be added to the reaction mixture. Heating is continued with the liquid reaction mixture at the preferred reaction temperature, until the removal of water by azeotropic distillation has substantially ceased. In general, any hydrocarbon solvent which forms an azeotropic mixture with water can be used. It is preferred, however, to use an aromatic hydrocarbon solvent of the benzene series, such as benzene, toluene and xylene. The amount of solvent used is variable and usually is dependent on the size of the reaction vessel and the reaction temperature selected. Accordingly, a sufficient amount of solvent must be used to support the azeotropic distillation, but a large excess must be avoided since the reaction temperature will be lowered thereby. Water produced by the reaction can also be removed by operating under reduced pressure. When operating with a reaction vessel equipped with a reflux condenser provided with a water takeoff trap, sufficient reduced pressure can be achieved by applying a slight vacuum to the upper end of the condenser. The pressure inside the system is usually reduced to between about 50 and about 300 millimeters. If desired, the water can be removed also by distillation, while operating under relatively high temperature conditions.

The time of reaction between the monocarboxylic acid reactant and the polyalkylenepolyamine reactant is dependent on the weight of the charge, the reaction temperature selected, and the means employed for removing the water from the reaction mixture. In practice, the reaction is continued until the formation of water has substantially ceased. In general, the time of reaction will vary between about six hours and about ten hours.

Any alkenyl succinic acid anhydride or the corresponding acid is utilizable for the production of the corrosion inhibitor reaction products of the present invention. The general structural formulae of these compounds are:

Anhydride

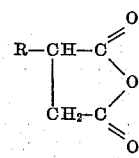

Acid

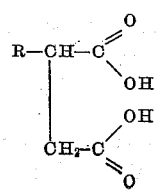

wherein R is an alkenyl radical. The alkenyl radical can be straight-chain or branched-chain; and it can be saturated at the point of unsaturation by the addition of a substance which adds to olefinic double bonds, such as hydrogen, sulfur, bromine, chlorine, or iodine. It is obvious, of course, that there must be at least two carbon atoms in the alkenyl radical, but there is no real upper limit to the number of carbon atoms therein. However, it is preferred to use an alkenyl succinic acid anhydride reactant having between about 8 and about 18 carbon atoms per alkenyl radical. In order to produce the corrosion inhibitors of this invention, however, an alkenyl succinic acid anhydride or the corresponding acid msut be used. Succinic acid anhydride and succinic acid are not utilizable herein. For example, the reaction product produced by reacting an intermediate product with succinic acid anhydride is an amorphous, dark, insoluble mass. Although their use is less desirable the alkenyl succinic acids also react, in accordance with the aforedescribed process, to produce satisfactory corrosion inhibiting reaction products. It has been found, however, that their use necessitates the removal of water formed during the reaction and also often causes undesirable side reactions to occur to some extent. Nevertheless, the alkenyl succinic acid anhydrides and the alkenyl succinic acids are interchangeable for the purpose of preparing corosion inhibitors of the present invention. Accordingly, when the term "alkenyl succinic acid anhydride" is used herein, it must be clearly understood that it embraces the alkenyl succinic acids as well as their anhydrides, and the derivatives thereof in which the olefinic double bond has been saturated as set forth hereinbefore. Non-limiting examples of the alkenyl succinic acid anhydride reactant are ethenyl succinic acid anhydrides; ethenyl succinic acid; ethyl succinic acid anhydride; propenyl succinic acid anhydride; sulfurized propenyl succinic acid anhydride; butenyl succinic acid; 2-methylbutenyl succinic acid anhydride; 1,2-dichloropentyl succinic acid anhydride; hexenyl succinic acid anhydride, hexyl succinic acid; sulfurized 3-methylpentenyl succinic acid anhydride; 2,3-dimethylbutenyl succinic acid anhydride; 3,3-dimethylbutenyl succinic acid; 1,2-dibromo-2-ethylbutyl succinic acid; heptenyl succinic acid anhydride; 1,2-diiodooctyl succinic acid; octenyl succinic acid anhydride; 2-methylheptenyl succinic acid anhydride; 4-ethylhexenyl succinic acid; 2-isopropylpentenyl succinic acid anhydride; noneyl succinic acid anhydride; 2-propylhexenyl succinic acid anhydride; decenyl succinic acid; decenyl succinic acid anhydride; 5-methyl-2-isopropylhexenyl succinic acid anhydride; 1,2-dibromo-2-ethyloctenyl succinic acid anhydride; decyl succinic acid anhydride; undecenyl succinic acid anhydride; 1,2-dichloroundecyl succinic acid; 3-ethyl-2-t-butylpentenyl succinic acid anhydride; dodecenyl succinic acid anhydride; dodecenyl succinic acid; 2-propylnonenyl succinic acid anhydride; 3-butyloctenyl succinic acid anhydride; tridecenyl succinic acid anhydride; tetradecenyl succinic acid anhydride; hexadecenyl succinic acid anhydride; sulfurized octadecenyl succinic acid; octadecyl succinic acid anhydride; 1,2-dibromo-2-methylpentadecenyl succinic acid anhydride; 8-propylpentadecyl succinic acid anhydride; eicosenyl succinic acid anhydride; 1,2-dichloro-2-methylnonadecenyl succinic acid anhydride; 2-octyldodecenyl succinic acid; 1,2-diiodotetracosenyl succinic acid anhydride; hexacosenyl succinic acid; hexacosenyl succinic acid anhydride; and hentriacontenyl succinic acid anhydride.

The methods of preparing the alkenyl succinic acid anhydrides are well known to those familiar with the art. The most feasible method is by the reaction of an olefin with maleic acid anhydride. Since relatively pure olefins are difficult to obtain, and when thus obtainable, are often too expensive for commercial use, alkenyl succinic acid anhydrides are usually prepared as mixtures by reacting mixtures of olefins with maleic acid anhydride. Such mixtures, as well as relatively pure anhydrides, are utilizable herein.

In general, the alkenyl succinic acid anhydride reactant is reacted with the intermediate product in a proportion of between about $(x-1)$ and about one mol of alkenyl succinic acid anhydride reactant for each mole of polyalkylenepolyamine reactant used in the preparation of the intermediate product, $x$ representing the number of nitrogen atoms in the polyalkylenepolyamine reactant molecule. The sum of the number of moles of monocarboxylic acid reactant and of alkenyl succinic acid anhydride reactant reacted with each mole of polyalkylenepolyamine reactant, in accordance with this invention, must not exceed the number of nitrogen atoms in the polyalkylenepolyamine reactant molecule. Accordingly, the maximum number of moles of alkenyl succinic acid anhydride reactant used is the difference between the number of nitrogen atoms in the polyalkylenepolyamine reactant molecule and the number of moles of monocarboxylic acid reactant used per mole of polyalkylenepolyamine reactant. As mentioned hereinbefore, however, the first molecule of the monocarboxylic acid reactant appears to react with two nitrogen atoms. Accordingly, in order to achieve a reaction product which does not involve a physical mixture of the intermediate product and/or the reaction product, representing the complete chemical interaction of the reactants, with the alkenyl succinic acid anhydride reactant, the sum of the number of moles of the monocarboxylic acid reactant and of the alkenyl succinic acid anhydride reactant reacted with each mole of polyalkylenepolyamine reactant must not exceed one less than the number of nitrogen atoms in the polyalkylenepolyamine molecule. In other words, the proportion of alkenyl succinic acid anhydride reactant to polyalkylenepolyamine reactant will vary between $(x-2):1$, respectively, and $1:1$, respectively. For example, when two moles of decanoic acid are reacted with one mole of tetraethylenepentamine to produce an intermediate product, one or two moles, but not more than two moles, of an alkenyl succinic acid anhydride is reacted with this intermediate product to produce a reaction product representing the complete chemical interaction of the reactants. However, three moles of an alkenyl succinic acid anhydride reactant can be reacted with this intermediate product to produce a product which comprises a physical mixture. Such a product is contemplated herein.

The reaction between the alkenyl succinic acid anhydride reactant and the intermediate product takes place at any temperature ranging from ambient temperatures and upwards. This reaction is apparently an amide formation reaction effected by the well known addition of the anhydride group to an amino or imino group. This addition proceeds at any temperature, but temperatures of about 100° C. or lower are preferred. When an alkenyl succinic acid is used, water is formed. Therefore, in this case, the reaction temperature preferably should be higher than about 100° C.

The reaction between the alkenyl succinic acid anhydride reactant and the intermediate product proceeds smoothly in the absence of solvents, at atmospheric pressure. However, the occurrence of undesirable side reactions is minimized when a solvent is employed. Use of a solvent is preferable when the reaction product is to be used in a steam turbine lubricating oil. Since a small amount of water is usually formed also when an alkenyl succinic acid anhydride is used in the reaction, the solvent employed is preferably one which will form an azeotropic mixture with water. These solvents have been discussed fully, hereinbefore, in conjunction with the reaction between the monocarboxylic acid reactant and the polyalkylenepolyamine reactant. The same solvents and the same methods of using them are applicable to the reaction between the intermediate product and the alkenyl succinic acid anhydride reactant. For example, satisfactory corrosion inhibitors have been prepared at temperatures varying between about 100° C. and about 110° C., using an aromatic hydrocarbon solvent of the benzene series. It is not necessary to separate the rust inhibitor from the solvent in the preparation of the mineral oil composition of this invention in that the amount of solvent which is inadvertently added does not significantly affect the viscosity characteristics and other properties of the mineral oil as compared to a mineral oil made up with the same rust inhibitor not in solution form.

The time of reaction is dependent on the size of the charge, the reaction temperature selected, and the means employed for removing any water from the reaction mixture. Ordinarily, the addition of the anhydride reactant is substantially complete within a few minutes. The more emulsive reaction products can be produced at temperatures below 100° C. for a reaction time of less than one hour. In order to ensure complete reaction, however, it is preferred to continue heating for several hours. For example, when benzene is used as the solvent at a temperature of 100–110° C., heating is continued for about five hours. When water is formed during the reaction, as when an alkenyl succinic acid is used, the completion of the reaction is indicated by a substantial decrease in the formation of water. In general, the reaction time will vary between several minutes and about ten hours.

For purposes of the present invention it is preferred that the aforedescribed corrosion inhibitors be prepared in a mineral oil solution. The mineral oil can be added to the reaction mixture of the aforedescribed intermediate product and alkenyl succinic acid anhydride reactant, before they are reacted with each other. In an alternate procedure, the reaction product can be produced by the methods mentioned hereinbefore, and then the mineral oil can be added to the reaction product while it is still hot. If a solvent is used, it is immaterial whether the solvent is removed before or after the addition of the mineral oil. Dependent on the type of reaction product involved and of final product desired, the mineral oil can be used in any amount, thereby producing reaction products containing from about one per cent by weight of oil up to as much as 99 per cent by weight of oil.

In general, the anti-rust mineral oil solutions of this invention will contain between about 0.001 percent and about 50 percent by weight based on the oil of the aforedescribed corrosion inhibitor, but preferably the amount will vary between 0.01 percent and 10 percent by weight.

The corrosion inhibitors of this invention are best defined by reciting the reactants and the number of moles of each which are used in the reaction. For example, the reaction product produced by reacting one mole of oleic acid with one mole of triethylene tetramine to produce an intermediate product which is then reacted with two moles of a dodecenyl succinic acid anhydride may be defined as the reaction product of oleic acid (I)+triethylenetetramine (I)+dodecenyl succinic acid anhydride (II).

In addition to the product described in the illustrative example, set forth hereinafter, others contemplated are described in U.S. Patent No. 2,568,876 to Landis et al. Still other examples of the reaction products contemplated herein are those produced by reacting the following combinations of reactants: formic acid (IV)+tetra-(1-ethyl-2-benzylethylene) pentamine (I)+ethenyl succinic acid anhydride (I); acetic acid anhydride (I)+tri-(1-methyl-1-phenyl-3-propylpropylene) tetramine (I)+ethenyl succinic acid (II); acetyl fluoride (I)+triethylenetetramine (I)+hexenyl succinic acid anhydride (II); fluoroacetic acid (II)+tetra-(1-methyl-3-benzylpropylene) pentamine (I)+ethyl succinic acid anhydride (II); propionic acid (I)+penta-(1-methyl-2-benzylethylene)-hexamine (I)+propenyl succinic acid anhydride (V); propiolic acid (I)+di-(1,18-dioctyloctadecylene) triamine (I)+sulfurized propenyl succinic acid anhydride (I); β-chloropropionic acid (II)+di-(1,2-dimethyl-14-nonyltetradecylene)-triamine (I)+butenyl succinic acid (I); bromoacetic acid (I)+dieicosylene-triamine (I)+2-methylbutenyl succinic acid anhydride (II); isobutyric acid (III)+trioctadecylenetetramine (I)+1,2-dichloropentyl succinic acid anhydride (I); α-bromobutyric acid (I)+tri-(1,15-dimethylpentadecylene) tetramine (I)+hexenyl succinic acid (I); isocrotonic acid chloride (I)+penta-(1-methyl-4-nonylbutylene) hexamine (I)+hexylsuccinic acid anhydride (IV); β-ethylacrylic acid (II)+tetradecylenepentamine (I)+sulfurized 3-methylpentenyl succinic acid anhydride (II); valeric acid (I)+didodecylenetriamine (I)+2,3-dimethylbutenyl succinic acid anhydride (I); α-bromoisovaleric acid (III)+tetra-(1,4-dipropylbutylene) pentamine (I)+3,3-dimethylbutenyl succinic acid (I); allylacetic acid (II)+tridecylene-triamine (I)+1,2-dibromo-2-ethylbutyl succinic acid (I); hexanoyl bromide (I)+tri-(1,4-diethylbutylene) tetramine (I)+heptenyl succinic acid anhydride (I); sorbic acid (IV)+tetraoctylenepentamine (I)+1,2-diiodoacetyl succinic acid (I); β-chloroacrylic acid (I)+penta-(1,2-dimethyl-1-isopropylethylene) hexamine (I)+octenyl succinic acid anhydride (V); nitrosobutyric acid (I)+di-(1-methyl-4-ethylbutylene) triamine (I)+2-methylheptenyl succinic acid anhydride (II); aminovaleric acid (V)+penta-1,5-dimethylamylene)-hexamine (I)+4-ethylhexenyl succinic acid (I); aminohexanoic acid (II)+tetra-(1,3-dimethylpropylene) pentamine (I)+2-isopropylpentenyl succinic acid anhydride (III); heptanoic acid anhydride (I)+di-(1-methylamylene) triamine (I)+nonyl succinic acid anhydride (II); 2-ethylhexanoic acid (III)+tri-1,2,2-trimethylethylene) tetramine (I)+2-propyl-hexenyl succinic acid anhydride (I); α-bromooctanoic acid (I)+pentaamylene-hexamine (I)+decenyl succinic acid anhydride (IV); decanoic acid (I)+di-(1-methylbutylene) triamine (I)+decenyl succinic acid (I); dodecanoic acid (V)+hexa-(1,1-dimethylethylene) heptamine (I)+5-methyl-2-isopropylhexenyl succinic acid anhydride (II); undecylenic acid (II)+tetrabutylenepentamine (I)+1,2-dibromo-2-ethyloctenyl succinic acid anhydride (II); tetradecanoic acid (III)+penta-(1-methylpropylene) hexamine (I)+octenyl succinic acid anhydride (II); hexadecanoic acid (I)+tri(ethylethylene) tetramine (I)+decyl succinic acid anhydride (III); palmitic acid (VI)+hexapropyleneheptamine (I)+undecenyl succinic acid anhydride (I); oleic acid (I)+di-(methylethylene) triamine (I)+1,2-dichloroundecyl succinic acid (I); heptadecanoic acid (IV)+tetraethylenepentamine (I)+3-ethyl-2-t-butylpentenyl succinic acid anhydride (I); stearic acid (I)+hexapropyleneheptamine (I)+dodecenyl succinic acid anhydride (VI); linoleic acid (IV)+hexa-(1,1-dimethylethylene) heptamine (I)+dodecenyl succinic acid (I); linoleic acid (I)+triethylenetetramine (I)+2-propylnoneyl succinic acid anhydride (III); phenylstearic acid (I)+diethylenetriamine (I)+3-butyloctenyl succinic acid anhydride (I); xylylstearic acid (II)+di-(methylethylene) triamine (I)+tridecenyl succinic acid anhydride (I); α-dodocyltetradecanoic acid (I)+diethylenetriamine (I)+tetradecenyl succinic acid anhydride (I); arachidic acid (II)+tetra-(1,3-dimethylpropylene) pentamine (I)+hexadecenyl succinic acid anhydride (III); behenic acid (I)+tetrabutylenepentamine (I)+sulfurized octadenecyl succinic acid anhydride (II); behinolic acid (III)+tetraethylenepentamine (I)+octadecyl succinic acid anhydride (II); erucic acid (I)+hexaethyleneheptamine (I)+1,2-dibromo-2-methylpentadecenyl succinic acid anhydride (V); melissic acid (I)+diethylenetriamine (I)+8-propylpentadecyl succinic acid anhydride (I); hexahydrobenzoic acid (II)+triethylenetetramine (I)+eiscosenyl succinic acid anhydride (II); hexahydrobenzoyl chloride (I)+dipropylenetriamine (I)+decenyl succinic acid anhydride (I); furoic acid (I)+di-(1-methylbutylene) triamine (I)+1,2-dichloro-2-methylnonadecyl succinic acid anhydride (II); chlorofuroic acid (V)+penta-(1-methylpropylene)-hexamine (I)+2-octyldodecenyl succinic acid (I); thiophenecarboxylic acid (I)+diethylenetriamine (I)+1,2-diiodotetracosenyl succinic acid anhydride (I); picolinic acid (III) +pentaamylenehexamine (I)+hexacosenyl succinic acid (II); nicotinic acid (I)+tetraethylenepentamine (I)+ hexacosenyl succinic acid anhydride (IV); benzoic acid (III)+tetraoctylenepentamine (I)+hentriacontenyl succinic acid anhydride (II); benzoyl iodide (I)+triethylenetetramine (I)+octenyl succinic acid anhydride (II); toluic acid anhydride (I)+diethylene-triamine (I)+ hentriacontenyl succinic acid (I)+xylic acid (II)+penta- (1,2-dimethyl-1-isopropylethylene) hexamine (I)+hexadecenyl succinic acid anhydride (IV); chloroanthranilic acid (I)+tetraethylenepentamine (I)+8-propylpentadecenyl succinic acid anhydride (III); chloronitrobenzoic acid (I)+diethylenetriamine (I)+decenyl succinic acid anhydride (II); cinnamic acid (IV)+hexapropyleneheptamine (I)+hentriacontenyl succinic acid anhydride (II); aminocinnamic acid (II)+triethylenetetramine (I) +hexenyl succinic acid anhydride (II); salicylic acid (II) +triethylenetetramine (I)+tetradecenyl succinic acid anhydride (II); hydroxytoluic acid (I)+tri-(1,2,2-trimethylethylene)-tetramine (I)+heptenyl succinic acid anhydride (III); iodosalicylic acid (II)+hexapropyleneheptamine (I)+octenyl succinic acid anhydride (V); and naphthoic acid (I)+tetraethylenepentamine (I)+hexacosenyl succinic acid anhydride (IV).

As illustrative of the preparation of such corrosion inhibitors is the following:

EXAMPLE A

Approximately 564 grams (substantially 2 mols) of oleic acid and approximately 219 grams (substantially 1.5 mols) of triethylene tetramine were placed in a reaction vessel which was provided with a stirrer, a thermometer, and a reflux takeoff trap. The reflux takeoff was filled with benzene and the agitated reactant mix heated to 140° C. Then, about 26.5 grams of benzene were added to the reaction mixture such that refluxing occurred with a pot temperature of 140–142° C. The reaction was continued for ten hours, during which time 57 milliliters of an aqueous layer was collected. The solvent was removed from the reaction mixture by distillation at a pot temperature of 145° C., and under about 20 millimeters' pressure. This intermediate product had an N.N. of 5.5 and an average molecular weight of about 484.

Approximately 225.7 grams (substantially 0.466 mol) of this intermediate, approximately 285.7 grams (substantially 1.074 mols) of tetrapropenyl succinic acid anhydride (produced as follows: 350 parts by weight of propylene tetramer, boiling range 355–472° F., A.P.I. gravity of 48–51°, bromine No. of 110.120, and 110 parts by weight of maleic anhydride were placed in a suitable reaction vessel and refluxed, about 170° C. for about 30 hours. The pressure was slowly decreased and the unreacted propylene tetramer distilled off. The residue was subjected to further vacuum distillation whereupon there is obtained about 194 parts by weight tetrapropenyl succinic acid anhydride, a clear liquid having a specific gravity of about 1.0 at 25° C.), and about 500 grams of mineral oil (furfural refined Mid-Continent distillate stock, specific gravity 0.860, Saybolt viscosity of 155 seconds at 100° F.) were placed in a reaction vessel. The reaction vessel was equipped with a thermometer, a stirrer, and an outlet tube which, in turn, was connected to a manometer, a trap, and a vacuum pump. The reactants were heated, with stirring, to 100° C. and the pressure in the reaction vessel was reduced to 50 millimeters. The reaction was continued under these conditions for three hours and the mass cooled to room temperature. The resultant solution (referred to hereinafter as the product of Example A) contained about 50 percent, by weight, of the active anti-rust agent, which inhibitor possessed an N.N. of about 58.

The preferred mineral oils used in the compositions of this invention are of the types normally used for the lubrication of steam turbines. In general, these oils may be defined as viscous mineral oil fractions having a Saybolt Universal viscosity of from 100 to 600 seconds at 100° F. and usually they are well refined, highly paraffinic materials.

The test employed to illustrate the effectiveness of the dimeric acids of this invention in preventing emulsification was determined by the Federal Standard Emulsion Test for Lubricating Oils (Federal Specification VVL–791d, Method 320.1.5, November 15, 1948). The test comprises agitating 40 cubic centimeters of the oil blend and water, respectively, at 130° F. with a standard specified stirrer for 5 minutes stirring at 1500 r.p.m. followed by settling at 130° F. and determining the time after removing the stirrer for the emulsion to break to such an extent that only 3 cc. of foam remains and determining also the time for complete break of the emulsion. The test was conducted with distilled water and also with a 1% sodium chloride solution. Employing the following compositions the tabulated results set forth were obtained.

| Composition | Turbine oil | | Product of Example A (parts by weight) | Polymerized Linoleic Acid [2] |
|---|---|---|---|---|
| | M [1] | N [1] | | |
| I | 100 | | 0.1 | |
| II | 100 | | 0.1 | 0.0000225 |
| III | 100 | | 0.1 | 0.000045 |
| IV | | 100 | 0.1 | |
| V | | 100 | 0.1 | 0.0000135 |
| VI | | 100 | 0.1 | 0.0000338 |

[1] Turbine oils M and N, respectively, possessed Saybolt viscosities at 210° F. of 46 seconds and 53 seconds.
[2] Consisting of 85% dimer, 12% trimer and 3% monomer.

*Table 1*

| Composition | Water | | 1% NaCl | |
|---|---|---|---|---|
| | 3 cc. | Break | 3 cc. | Break |
| | Sec. | Sec. | Sec. | Sec. |
| I | 24 | 26 | 23 | 25 |
| II | | 11 | 8 | 14 |
| III | | 8 | 4 | 8 |
| IV | 60 | 63 | 65 | 72 |
| V | 49 | 51 | 43 | 45 |
| VI | 18 | 20 | 18 | 21 |

The dimeric acids described herein as the foregoing data attests are effective demulsifiers when employed in very low proportions in mineral oil solutions of the corrosion inhibitor reaction product obtained by reacting monocarboxylic acids, polyalkylenepolyamines having one more nitrogen atom per molecule than alkylene groups in the molecule, and alkenyl succinic acid anhydrides. The demulsifying effect of the dimeric acids is not materially affected by the presence of other adjuvants in the oil. They are stable materials which can be hydrolyzed only with difficulty, and since they are present in the oils in only very small quantities their use of even very acidic or very basic additions in the oil has substantially no effect. Mineral oils containing the dimeric acids in addition to the aforedescribed corrosion inhibitor reaction product are stable when stored over long periods of time and also when subjected to heat and pressure conditions of engine and motor operation.

While the demulsifying effect of the dimeric acids is obtained when they are employed in concentrations of up to 0.1% by weight, they may be incorporated in mineral oil concentrates of the aforedescribed corrosion inhibitor reaction product in much higher proportions, as for example soluble amounts up to 15% by weight. Such a concentrate may be manufactured and sold for use as lubricant additives. Addition of such concentrates in small amounts to mineral oils may be made so as to supply a corrosion inhibiting mineral oil composition containing a demulsifying quantity of the dimeric acids.

In addition to turbine oils other mineral oils are contemplated, as for example lubricating oils for internal combustion engines and motors, diesel lubricants, diesel fuels, industrial lubricants, process oils, hydraulic oils, cutting oils, fluid greases, gear oils, shock absorber oils, spindle oils, journal bearing oils, and the like, whether paraffinic or naphthenic in nature, or blended.

The dimeric acids impart demulsifying properties to mineral oils in general containing the aforedescribed corrosion inhibitors, and may be used in the presence of the customarily employed additives such as extreme pressure additives, detergent additives, dyes, antioxidants, etc.

It has been found in accordance with this invention that the demulsifying properties of the aforedescribed dimeric acids are increased by the presence of an alk-aryl acid ester of phosphorus of the general formula

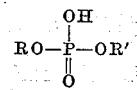

where R is an alkyl substituted phenyl radical and where R' is hydrogen or an alkyl substituted phenyl radical. By "alkyl substituted phenyl radical" is meant a phenyl radical containing one or two like or unlike substituents, such as methyl, ethyl, propyl, butyl, amyl, hexyl, heptyl, octyl, decyl, dodecyl, and their various isomers. It is preferred that the alkyl substituents be on the 2 and/or 4 positions of the phenyl nucleus, and it is particularly preferred that they contain from 3 to 6 carbon atoms. These acid esters are prepared by reacting phosphorus pentoxide with an alkyl substituted phenol in a molar ratio of about 1:3, the reaction product being an equi-weight mixture of the mono-(alkyl substituted phenyl) acid ester of phosphorus and the di-(alkyl substituted phenyl) acid ester of phosphorus $$3R''OH + P_2O_5 \rightarrow (R''O)(HO)_2PO + (R''O)_2(HO)PO$$

which esters are readily separable by means well known in the art. However, from the standpoint of economy it is not necessary to separate them in that the said mixture so obtained can be used, and as illustrative of such the following compositions were prepared:

| Composition | VII | VIII | IX | X |
|---|---|---|---|---|
| Turbine oil _____parts by weight__ | 100 | 100 | 100 | 100 |
| Product of Example A _____do___ | 0.1 | 0.1 | 0.1 | 0.1 |
| Polymerized linoleic acid [1] (× 10⁻⁵)___do___ | | 13.5 | | 13.5 |
| Mixed acid esters of phosphorus [2] (× 10⁻⁵) parts by weight__ | | | 1.5 | 1.5 |

[1] Consisting of 85% dimer, 12% trimer and 3% monomer.
[2] Consisting of 50% mono-(2,4-di-tert. amyl phenyl) acid ester of phosphorus and 50% di-(2,4-di-tert. amyl phenyl) acid ester of phosphorus prepared by reacting substantially 3 moles of 2,4-di-tert. amyl phenol with substantially 1 mole of phosphorus pentoxide.

The compositions so prepared were submitted to the Federal Standard Emulsion test for Lubricating Oils (Federal Specification VVL-791d, Method 320.1.5, November 15, 1948) hereinbefore described for distilled water and one percent sodium chloride solution. The results of the tests are as follows:

| Composition | Water | | 1% NaCl | |
|---|---|---|---|---|
| | 3 cc. | Break | 3 cc. | Break |
| | Sec. | Sec. | Sec. | Sec. |
| VII | 60 | 63 | 65 | 72 |
| VIII | 49 | 51 | 43 | 45 |
| IX | 57 | 60 | 52 | 55 |
| X | 30 | 33 | 18 | 20 |

Similar results are obtained employing in place of the mixture of acid esters of phosphorus in the foregoing example an equal weight, respectively, of the mixture of mono- and di-(2,4-di-isoamyl phenyl) acid esters of phosphorus obtained from phosphorus pentoxide and 2,4-di-isoamyl phenol, the mixture of mono- and di-(2-isoamyl phenyl) acid esters of phosphorus obtained from phosphorus pentoxide and 2-isoamyl phenol, the mixture of mono- and di-(2,4-di-tertiary butyl phenyl) acid esters of phosphorus obtained from phosphorus pentoxide and 2,4-di-tertiary butyl phenol, the mixture of mono- and di-(2-n-hexyl phenyl) acid esters of phosphorus obtained from phosphorus pentoxide and 2-n-hexyl phenol, the mixture of mono- and di-(4-isopropyl phenyl) acid esters of phosphorus obtained from phosphorus pentoxide and 4-isopropyl phenol. Other mixtures of mono- and di-(alkyl substituted phenyl) acid esters of phosphorus which are operable in the compositions of this invention include the products of phosphorus pentoxide and, respectively, 2-ethyl phenol, 4-isobutyl phenol, 4-isoamyl phenol, 2-ethylhexyl phenol, 2-n-octyl phenol, 2-decyl phenol, and 2-dodecyl phenol. It is to be understood that either the mono-(alkyl substituted phenyl) acid ester of phosphorus or the di-(alkyl substituted phenyl) acid ester of phosphorus may be employed per se, and that any mixture thereof is contemplated.

This application is a continuation-in-part of co-pending application Serial No. 447,406, filed August 2, 1954, now U.S. Patent No. 2,794,782.

What is claimed is:

1. A rust inhibiting composition comprising a major amount of a mineral oil fraction containing (a) between about 0.001% and about 50% by weight based on the mineral oil fraction of the reaction product obtained by reacting an aliphatic monocarboxylic acid containing from 10 to 30 carbon atoms with a polyalkylenepolyamine of the formula $H_2N(C_2H_4NH)_zH$, wherein $z$ is an integer from 2 to 6 inclusive to produce an intermediate product and reacting an alkenyl succinic acid anhydride, wherein the alkenyl radical contains from 8 to 18 carbon atoms, with said intermediate product, the said reaction product dissolved in the said mineral oil fraction providing a solution characterized by being normally susceptible to the formation of oil-in-water emulsions in the presence of water, and (b) between about 0.001% and about 15% by weight based on the mineral oil fraction of a dimeric acid produced by the condensation of unsaturated aliphatic monocarboxylic acids having between about 16 and about 18 carbon atoms per molecule, and (c) about 5% to about 20% by weight based on the dimeric acid content of an acid ester of phosphorus of the structure

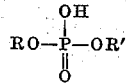

where R is an alkyl substituted phenyl radical and where R' is selected from the group consisting of hydrogen and alkyl substituted phenyl radicals, wherein the respective alkyl substituents contain from 1 to 12 carbon atoms, and wherein the said alkyl substituted phenyl radicals are selected from the group consisting of 2-alkyl-phenyl, 4-alkyl-phenyl, and 2,4-dialkyl-phenyl radicals.

2. An anti-rust turbine oil consisting essentially of a well-refined mineral oil fraction of lubricating viscosity containing dissolved therein (a) between about 0.01% and about 10% by weight based on the oil of the reaction product obtained by reacting an aliphatic monocarboxylic acid containing from 10 to 30 carbon atoms with a polyalkylenepolyamine of the formula $H_2N(C_2H_4NH)_zH$, wherein $z$ is an integer from 2 to 6 inclusive, in a molar proportion varying between about one and about $(x-1)$ to one, respectively, wherein $x$ represents the number of nitrogen atoms in the polyalkylenepolyamine to produce an intermediate product, and reacting an alkenyl succinic acid anhydride, wherein the alkenyl radical contains from 8 to 18 carbon atoms, with said intermediate product in a molar proportion varying between about $(x-1)$ and about one to one, respectively; the sum of the number of moles of said monocarboxylic acid and of said alkenyl succinic acid anhydride reacted with each mole of said polyalkylenepolyamine being no greater than $x$, the said reaction product dissolved in the said mineral oil fraction providing a solution characterized by being normally susceptible to the formation of oil-in-water emulsions in the presence of water, and (b) between about 0.001% and about 0.1% by weight based on the oil of a dimeric acid produced by the condensation of unsaturated aliphatic monocarboxylic acids having between about 16 and about 18 carbon atoms per molecule, and (c) about 5% to about 20% by weight based on the dimeric acid content of a (2,4-dialkyl substituted phenyl) acid ester of phosphorus of the structure

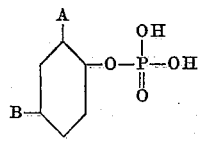

wherein A and B, respectively, are alkyl radicals containing from 3 to 6 carbon atoms.

3. An anti-rust turbine oil consisting essentially of a well-refined mineral oil fraction of lubricating viscosity containing dissolved therein (a) between about 0.01% and about 10% by weight based on the oil of the reaction product obtained by reacting an aliphatic monocarboxylic acid containing from 10 to 30 carbon atoms with a polyalkylenepolyamine of the formula $H_2N(C_2H_4NH)_zH$, wherein $z$ is an integer from 2 to 6 inclusive, in a molar proportion varying between about one and about $(x-1)$ to one, respectively, wherein $x$ represents the number of nitrogen atoms in the polyalkylenepolyamine to produce an intermediate product, and reacting an alkenyl succinic acid anhydride, wherein the alkenyl radical contains from 8 to 18 carbon atoms, with said intermediate product in a molar proportion varying between about $(x-1)$ and about one to one, respectively; the sum of the number of moles of said monocarboxylic acid and of said alkenyl succinic acid anhydride reacted with each mole of said polyalkylenepolyamine being no greater than $x$, the said reaction product dissolved in the said mineral oil fraction providing a solution characterized by being normally susceptible to the formation of oil-in-water emulsions in the presence of water, and (b) between about 0.001% and about 0.1% by weight based on the oil of a dimeric acid produced by the condensation of unsaturated aliphatic monocarboxylic acids having between about 16 and about 18 carbon atoms per molecule, and (c) about 5% to about 20% by weight based on the dimeric acid content of a (2,4-dialkyl substituted phenyl) acid ester of phosphorus of the structure

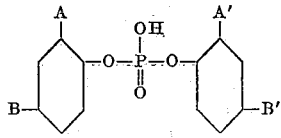

wherein A, A', B and B', respectively, are alkyl radicals containing from 3 to 6 carbon atoms.

4. An anti-rust turbine oil consisting essentially of a well-refined mineral oil fraction of lubricating viscosity containing dissolved therein (a) between about 0.01% and about 10% by weight of the reaction product obtained by reacting an aliphatic monocarboxylic acid containing from 10 to 30 carbon atoms with a polyalkylenepolyamine of the formula $H_2N(C_2H_4NH)_zH$, wherein $z$ is an integer from 2 to 6 inclusive, in a molar proportion varying between about one and about $(x-2)$ to one, respectively, wherein $x$ represents the number of nitrogen atoms in the polyalkylenepolyamine molecule, to produce an intermediate product, and reacting an alkenyl succinic acid anhydride, wherein the alkenyl radical contains from 8 to 18 carbon atoms, with said intermediate product, in a molar proportion varying between about $(x-2)$ and about one to one, respectively; the sum of the number of moles of said monocarboxylic acid and of said alkenyl succinic acid anhydride reacted with each mole of said polyalkylenepolyamine being no greater than $(x-1)$, the said reaction product dissolved in the said mineral oil fraction providing a solution characterized by being normally susceptible to the formation of oil-in-water emulsions in the presence of water, and (b) between about 0.0025% and about 0.05% by weight of a polymerized linoleic acid which consists essentially of the dimer, and (c) about 5% to about 20% by weight based on the dimeric acid content of a (2,4-dialkyl substituted phenyl) acid ester of phosphorus of the structure

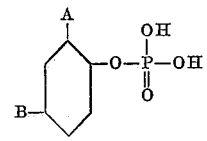

wherein A and B, respectively, are alkyl radicals containing from 3 to 6 carbon atoms.

5. An anti-rust turbine oil consisting essentially of a well-refined mineral oil fraction of lubricating viscosity containing dissolved therein (a) between about 0.01% and about 10% by weight of the reaction product obtained by reacting an aliphatic monocarboxylic acid containing from 10 to 30 carbon atoms with a polyalkylenepolyamine of the formula $H_2N(C_2H_4NH)_zH$, wherein $z$ is an integer from 2 to 6 inclusive, in a molar proportion varying between about one and about $(x-2)$ to one, respectively, wherein $x$ represents the number of nitrogen atoms in the polyalkylenepolyamine molecule, to produce an intermediate product, and reacting an alkenyl succinic acid anhydride, wherein the alkenyl radical contains from 8 to 18 carbon atoms, with said intermediate product, in a molar proportion varying between about $(x-2)$ and about one to one, respectively; the sum of the number of moles of said monocarboxylic acid and of said alkenyl succinic acid anhydride reacted with each mole of said polyalkylenepolyamine being no greater than $(x-1)$, the said reaction product dissolved in the said mineral oil fraction providing a solution characterized by being normally susceptible to the formation of oil-in-water emulsions in the presence of water, and (b) between about 0.0025% and about 0.05% by weight of a polymerized linoleic acid which consists essentially of the dimer, and (c) about 5% to about 20% by weight based on the dimeric acid content of a (2,4-dialkyl substituted phenyl) acid ester of phosphorus of the structure

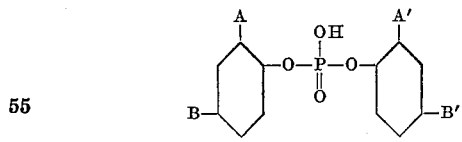

wherein A, A', B and B', respectively, are alkyl radicals containing from 3 to 6 carbon atoms.

6. An anti-rust emulsion resistant turbine oil composition consisting essentially of a well-refined mineral oil of lubricating viscosity containing dissolved therein (a) between about 0.01% and about 10% by weight of the reaction product obtained by reacting oleic acid with triethylenetetramine, in a molar proportion varying between about one and about three to one, respectively, to produce an intermediate product, and reacting tetrapropenyl succinic acid anhydride with said intermediate product, in a molar proportion varying between about three and about one to one, respectively; the sum of the number of moles of said oleic acid and of said tetrapropenyl succinic acid anhydride reacted with each mole of said triethylenetetramine being no greater than four, and (b) between about 0.0025% and about 0.05% by weight of a polymerized linoleic acid which consists essentially of the dimer, and (c) about 5% to about 20% by weight based on the dimeric acid content of mono-(2,4-di-tertiary amyl phenyl) acid ester of phosphorus

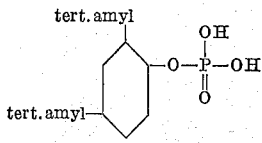

7. An anti-rust emulsion resistant turbine oil composition consisting essentially of a well-refined mineral oil of lubricating viscosity containing dissolved therein (a) between about 0.01% and about 10% by weight of the reaction product obtained by reacting oleic acid with triethylene-tetramine, in a molar proportion of about one to one, respectively, to produce an intermediate product, and reacting tetrapropenyl succinic acid anhydride with said intermediate product, in a molar proportion of about two to one, respectively, and (b) between about 0.0025% and about 0.05% by weight of a polymerized linoleic acid which consists essentially of the dimer, and (c) about 5% to about 20% by weight based on the dimeric acid content of mono-(2,4-di-tertiary amyl phenyl) acid ester of phosphorus

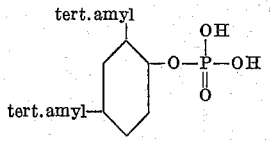

8. An anti-rust emulsion resistant turbine oil composition consisting essentially of a well-refined mineral oil of lubricating viscosity containing dissolved therein (a) between about 0.01% and about 10% by weight of the reaction product obtained by reacting oleic acid with triethylene-tetramine, in a molar proportion varying between about one and about three to one, respectively, to produce an intermediate product, and reacting an alkenyl succinic acid anhydride having between about ten carbon atoms and about twelve carbon atoms per alkenyl radical with said intermediate product, in a molar proportion varying between about three and about one to one, respectively; the sum of the number of moles of said oleic acid and of said alkenyl succinic acid anhydride reacted with each mole of said triethylenetetramine being no greater than four, and (b) between about 0.0025% and about 0.05% by weight of a polymerized linoleic acid which consists essentially of the dimer, and (c) about 5% to about 20% by weight based on the dimeric acid content of mono-(2,4-di-tertiary amyl phenyl) acid ester of phosphorus

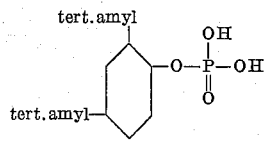

9. An anti-rust emulsion resistant turbine oil composition consisting essentially of a well-refined mineral oil of lubricating viscosity containing dissolved therein (a) between about 0.01% and about 10% by weight of the reaction product obtained by reacting oleic acid with triethylenetetramine, in a molar proportion of about three to one, respectively, to produce an intermediate product, and reacting an alkenyl succinic acid anhydride having between about ten carbon atoms and about twelve carbon atoms per alkenyl radical with said intermediate product, in a molar proportion of about one to one, respectively, and (b) between about 0.0025% and about 0.05% by weight of a polymerized linoleic acid which consists essentially of the dimer, and (c) about 5% to about 20% by weight based on the dimeric acid content of mono-(2,4-di-tertiary amyl phenyl) acid ester of phosphorus

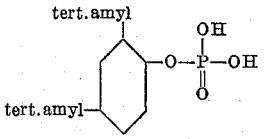

References Cited in the file of this patent
UNITED STATES PATENTS

| | | |
|---|---|---|
| 2,568,876 | White | Sept. 25, 1951 |
| 2,631,979 | McDermott | Mar. 17, 1953 |
| 2,656,374 | Gamrath | Oct. 20, 1953 |
| 2,693,448 | Landis | Nov. 2, 1954 |

UNITED STATES PATENT OFFICE

CERTIFICATE OF CORRECTION

Patent No. 2,908,649

October 13, 1959

Elijah P. Cunningham et al.

It is hereby certified that error appears in the printed specification of the above numbered patent requiring correction and that the said Letters Patent should read as corrected below.

Column 1, line 37, for "alkylene", second occurrence, read -- alkenyl --; column 10, line 2, for "(H)" read -- (II) --; line 19, for "(1,4-diethylbutylene" read -- (1,4-diethylbutylene) --; line 71, for "eiscosenyl" read -- eicosenyl --; column 11, line 53, for "bromine" read -- Bromine --.

Signed and sealed this 28th day of June 1960.

(SEAL)
Attest:

KARL H. AXLINE
Attesting Officer

ROBERT C. WATSON
Commissioner of Patents